US007844106B2

(12) United States Patent
Pfister et al.

(10) Patent No.: US 7,844,106 B2
(45) Date of Patent: *Nov. 30, 2010

(54) METHOD AND SYSTEM FOR DETERMINING POSES OF OBJECTS FROM RANGE IMAGES USING ADAPTIVE SAMPLING OF POSE SPACES

(75) Inventors: Hanspeter Pfister, Arlington, MA (US); In Kyu Park, Seoul (KR); Marcel German, Zurich (CH); Michael D. Breitenstein, Zurich (CH)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 182 days.

This patent is subject to a terminal disclaimer.

(21) Appl. No.: 12/238,618

(22) Filed: Sep. 26, 2008

(65) Prior Publication Data

US 2009/0074238 A1    Mar. 19, 2009

Related U.S. Application Data

(63) Continuation-in-part of application No. 11/738,642, filed on Apr. 23, 2007.

(51) Int. Cl.
*G06K 9/00* (2006.01)

(52) U.S. Cl. .................. 382/154; 382/100; 345/418; 345/419; 345/420; 345/582; 345/583; 345/584; 345/585; 345/586; 345/587; 345/588; 345/650; 345/651; 345/652; 345/653; 345/654; 345/655; 345/676; 345/677; 345/678; 345/679; 345/680; 345/681

(58) Field of Classification Search .................. None
See application file for complete search history.

(56) References Cited

U.S. PATENT DOCUMENTS

| 6,556,196 | B1* | 4/2003 | Blanz et al. ........... 345/419 |
| 7,714,872 | B2* | 5/2010 | Aoki ..................... 345/582 |
| 2003/0123713 | A1* | 7/2003 | Geng ..................... 382/118 |
| 2006/0023923 | A1* | 2/2006 | Geng et al. ............ 382/116 |
| 2008/0089561 | A1* | 4/2008 | Zhang ................... 382/118 |

OTHER PUBLICATIONS

Ikeuchi, "Generating an interpretation tree from a cad model for 3d object recognition in bin-packing tasks," 1987, International Journal computer vision, pp. 145-165.*

Jost et al., "A multi-resolution ICP with Heuristic Closest Point Search for Fast and Robust 3D Registration of Range Images," Oct. 6-10, 2003, IEEE, pp. 427-433.*

* cited by examiner

*Primary Examiner*—Samir A. Ahmed
*Assistant Examiner*—John W Lee
(74) *Attorney, Agent, or Firm*—Dirk Brinkman; Gene Vinokur

(57) ABSTRACT

A method for determining a pose of an object from a range image is presented. A distribution of poses for an object is determined from a model of the object. A set of reference poses is selected according to the distribution, such that more reference poses are selected for more probable poses than less probable poses. A reference image for each reference pose is generated, and the reference pose used to generate the reference image that best matches a range image including the object is assigned as the pose of the object.

16 Claims, 17 Drawing Sheets

100

Algorithm 1 Signed EDT $coord(p)$ = coordinates of the closest edge e found to far
$value(p)$ = signed distance value to e
Require: $value(b) = -(m+1) \quad \forall b \in$ background
Require: $value(f) = +(m+1) \quad \forall f \in$ foreground
Require: $value(e) = 0 \quad \forall e \in$ edge
Require: $coord(p) = (x_p, y_p) \quad \forall p \in$ image
for all iterations $m$ do
  for all pixels $p$ do
    for all direct neighbors $n$ of $p$ do
      if $distance(p, coord(n)) < |value(p)|$ then
        $value(p) = signed\_distance(p, coord(n))$
        $coord(p) = coord(n)$

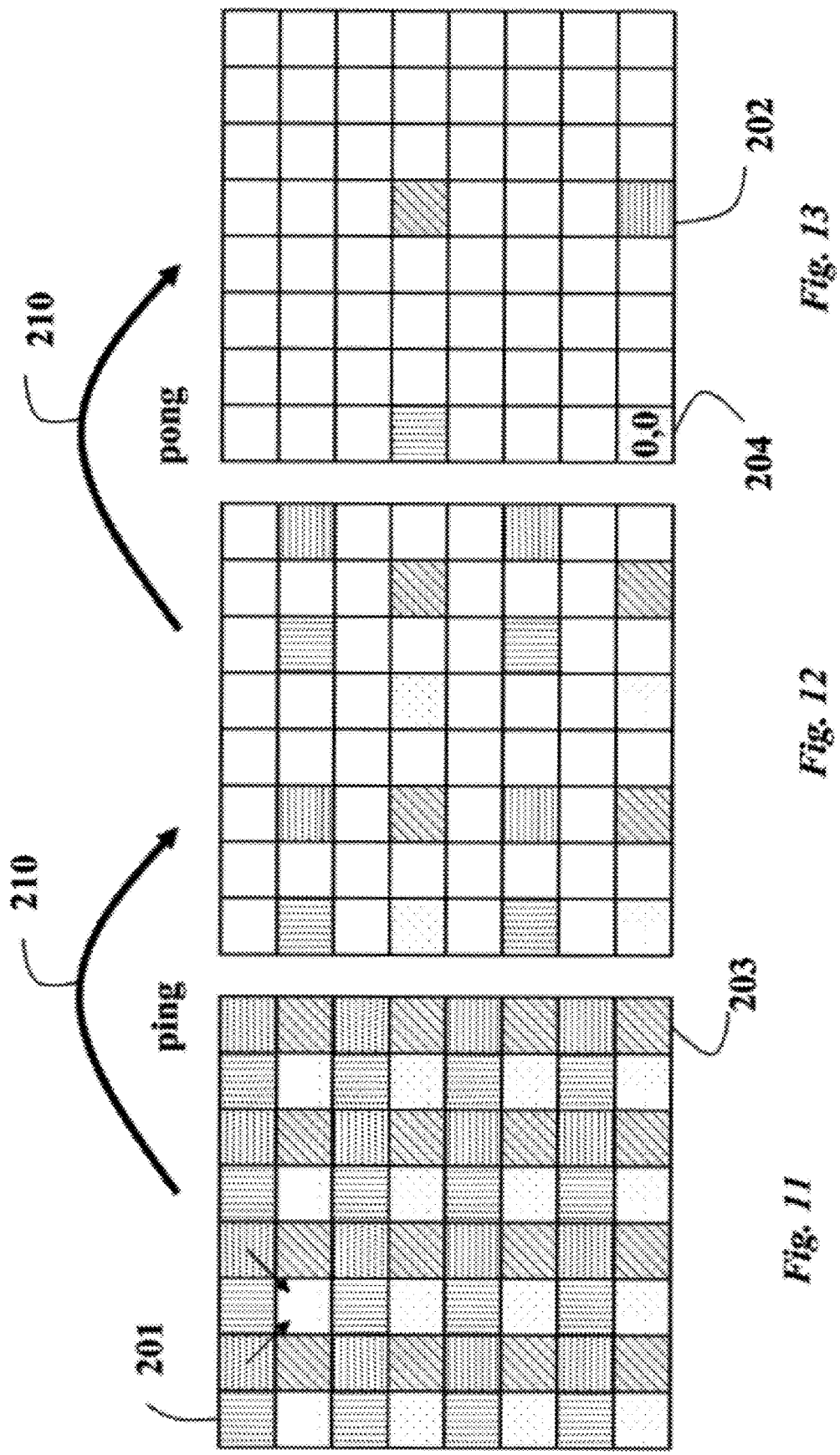

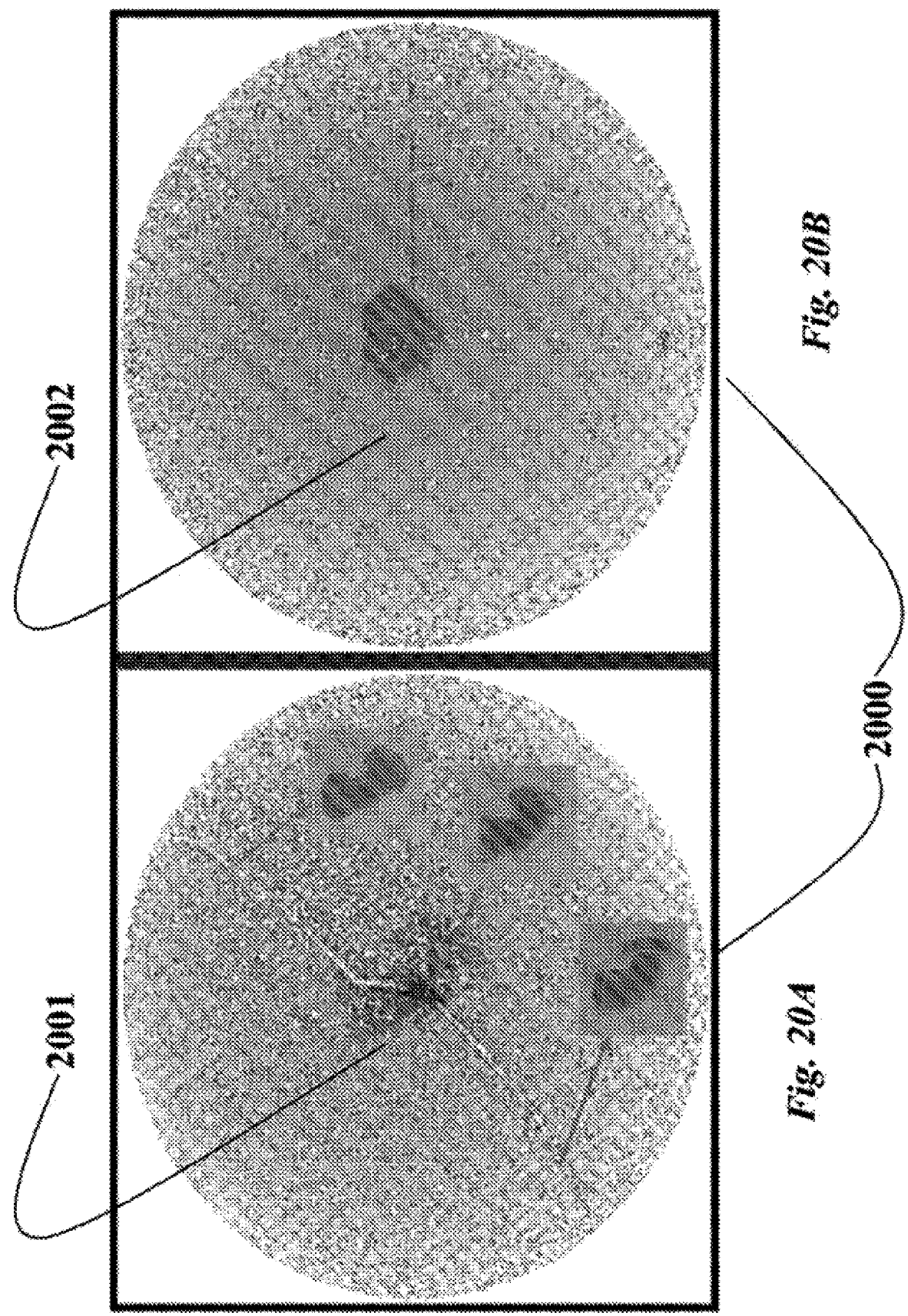

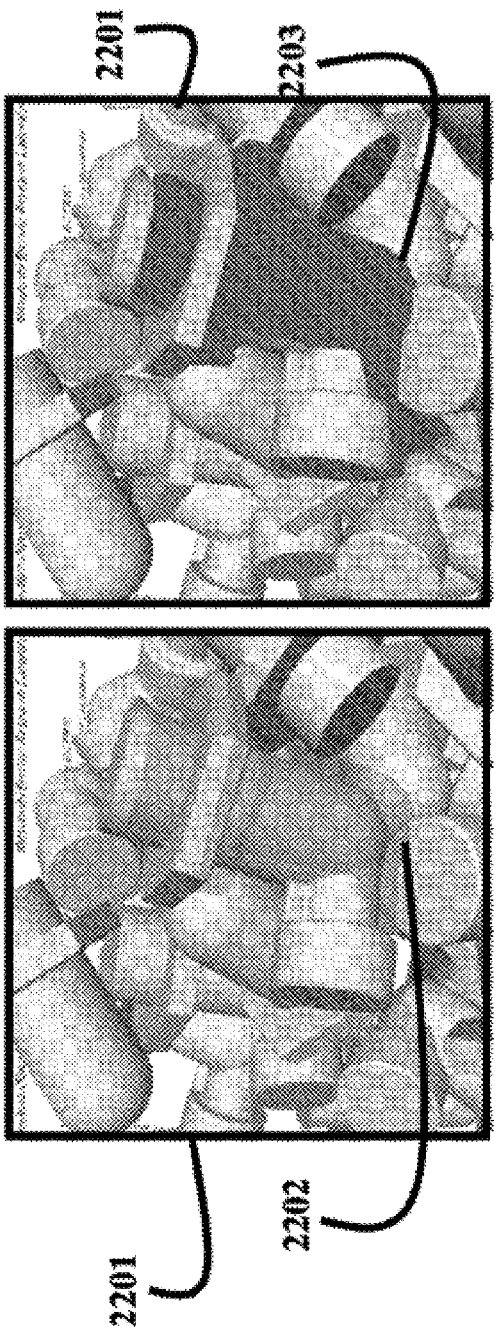
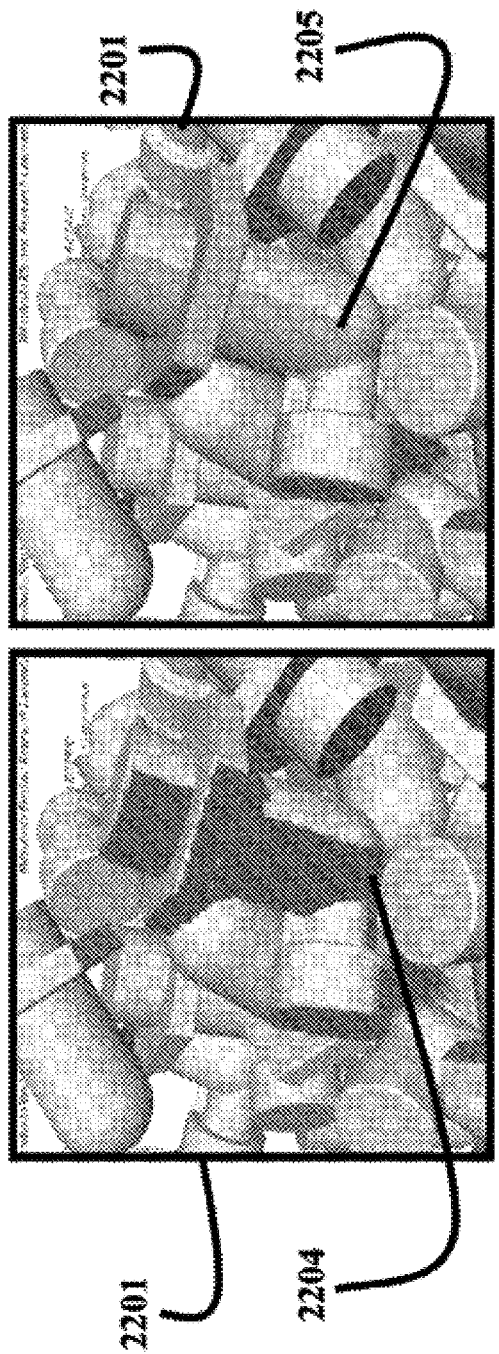

METHOD AND SYSTEM FOR DETERMINING POSES OF OBJECTS FROM RANGE IMAGES USING ADAPTIVE SAMPLING OF POSE SPACES

RELATED APPLICATION

This application is a Continuation in Part of U.S. patent application Ser. No. 11/738,642, "Method and System for Determining Objects Poses from Range Images" filed by Pfister et al. on Apr. 23, 2007, and incorporated by reference.

FIELD OF THE INVENTION

This invention relates generally to computer vision and more particularly to determining poses of objects from images acquired of the objects using adaptive sampling of the pose spaces of the objects.

BACKGROUND OF THE INVENTION

A common task in computer vision applications is to estimate a pose of objects from images acquired of a scene. Herein, the pose is defined as the 6-DOF location and orientation of an object. Pose estimation in scenes with clutter, e.g., other objects, noise, and occlusions, e.g., due to multiple overlapping objects, can be quite challenging. Furthermore, pose estimation in 2D images and videos is sensitive to illumination variation, shadows, and lack of features, e.g., shiny objects without texture.

Pose estimation from range images, in which each pixel includes an estimate of a distance to the objects, does not suffer from these limitations. Range images can be acquired with active light systems, such as laser range scanners, or using active light stereo methods. Range images are often called range maps. Hereinafter, these two terms are synonymous.

If a 3D model of the objects is available, then one can use model-based techniques, where the 3D model of the object is matched to the images or range images of the scene. Model-based pose estimation has been used in many computer vision applications such as object recognition, object tracking, robot navigation, and motion detection.

The main challenge in pose estimation is invariance to partial occlusions, cluttered scenes, and large pose variations. Methods for 2D images and videos generally do not overcome these problems due to their dependency on appearance and sensitivity to illumination, shadows, and scale. Among the most successful attempts are methods based on global appearance, and methods based on local 2D features. Unfortunately, those methods usually require a large number of training examples because they do not explicitly model local variations in the structure of the objects.

Model-based surface matching techniques, using a 3D model, have become popular due to the decreasing cost of 3D scanners. One method uses a viewpoint consistency constraint to establish correspondence between a group of viewpoint-independent image features and the object model, D. Lowe, "The viewpoint consistency constraint," International Journal of Computer Vision, volume 1, pages 57-72, 1987. The most popular method for aligning 3D models, based on the geometry, is the iterative closest point (ICP) method, that has been improved by using geometric descriptors, N. Gelfand, N. Mitra, L. Guibas, and H. Pottmann, "Robust global registration," Proceeding Eurographics Symposium on Geometry Processing, 2005. However, those methods only address the problem of fine registration where an initial pose estimate is required.

Geometric hashing is an efficient method for establishing multi-view correspondence and object pose due to its insensitivity of the matching time to the number of views. However, the building of the hash table is time consuming and the matching process is sensitive to image resolution and surface sampling.

Another method matches 3D features, or shape descriptors, to range images using curvature features by calculating principal curvatures, Dorai et al., "Cosmos—a representation scheme for 3d free-form objects," PAMI, 19(10), pp. 1115-1130, 1997. That method requires the surface to be smooth and twice differentiable, and thus, that method is sensitive to noise. Moreover, occluded objects cannot be handled.

Another method uses "spin-image" surface signatures to convert an image of a surface to a histogram, A. Johnson and M. Hebert, "Using spin images for efficient object recognition in cluttered 3d scenes," PAMI, 21(5), pp. 433-449, 1999. That method yields good results with cluttered scenes and occluded objects. But that method is time-consuming, sensitive to image resolution, and might lead to ambiguous matches.

Another method constructs a multidimensional table representation, referred to as tensors, from multiple unordered range images, and a hash-table based voting scheme is used to match the tensor to objects in a scene. That method is used for object recognition and image segmentation, A. Mian, M. Bennamoun, and R. Owens, "Three-dimensional model-based object recognition and segmentation in cluttered scenes," PAMI, 28(12), pp. 1584-1601, 2006. However, that method requires fine geometry and has a runtime of several minutes, which is inadequate for real-time applications.

Shang et al., in "Discrete Pose Space Estimation to Improve ICP-based Tracking," Proceedings of the Fifth International Conference on 3-D Digital Imaging and Modeling, pp. 523-530, June 2005, use the bounded Hough transform (BHT) to determine an initial estimate of the pose before performing the ICP. However, that method was developed for object tracking, and not pose estimation.

A large class of methods use a deformable (morphable) 3D model and minimize a cost term such that the model projections match to input images, M. Jones and T. Poggio, "Multidimensional Morphable Models: A Framework for Representing and Matching Object Classes," International Journal of Computer Vision, vol. 29, no. 2, pp. 107-131, August 1998; V. Blanz and T. Vetter, "A Morphable Model for the Synthesis of 3D Faces," Proc. ACM SIGGRAPH, pp. 187-194, August 1999. However, optimizing many parameters while projecting the 3D model is inefficient and those methods also require an initial pose estimate.

Another method pre-computes range maps of the model, and uses a tree structure and geometric probing, Greenspan et al., "Geometric Probing of Dense Range Data," IEEE Trans. Pattern Analysis and Machine Intelligence, vol. 24, no. 4, pp. 495-508, April 2002. However, the time to process the model depends on the size of the object, and requires at least four seconds for reliable results, making the method unsuitable for real-time applications.

Breitenstein et al., in "Real-Time Face Pose Estimation from Single Range Images," Proc. IEEE Conference on Computer Vision and Pattern Recognition, June 2008, estimate the pose of a face by comparing pre-computed reference range images with an input range image. However, that method relies on a signature to approximate the 3D face in a low resolution and search in the full pose space.

Recent advance in computer graphics enables the simulation of real world behavior using models. For example, it is possible to generate 3D virtual models of objects and a variety of photorealistic images that can be used as input for computer vision applications. In addition, accurate collision detection and response simulation in 3D virtual scenes provide valuable information to motion analysis in computer vision research.

General Purpose GPU (GPGPU) Applications

Graphics processing units (GPUs) can accelerate graphics procedures that cannot be performed efficiently with a conventional CPU. Because computer graphics and image processing have similar computational requirements, there has been a substantial amount of work to apply the processing capabilities of GPUs to computer vision and image processing applications.

The main disadvantage of using GPUs in non-graphics applications is the limitation of the 'scatter' operation. In GPUs, the fragment processor cannot perform a direct scatter operation because the location of each fragment on a grid is fixed at the time of the fragment's creation and cannot be altered by the programmer. Each parallel processing thread can only output a single pixel value, which can be four floating point numbers at most. In addition to this, it is inconvenient to use off-screen rendering because users need to understand the internal structure of graphics pipeline, and the usage of texture.

On the other hand, there are new architecture platforms for GPGPUs. For example, NVIDIA's Compute Unified Device Architecture (CUDA) enables the use of the entire video memory space as a linear memory with flexible gather (read) and scatter (write) operations. In addition, users can control the multithreading structure dynamically, which provides a more efficient assignment of the processing threads and memory.

The computational throughput of modern GPUs has greatly increased. For example, NVIDIA's G80 (GeForce 8800) has about 700 million transistors and performs approximately at 350 GFLOPS, while the 2.66 GHz Intel Core™2 Duo processor performs at 50 GFLOPS. Furthermore, modern GPUs are equipped with high-level shading capabilities that facilitate the programmability of the functions of the GPU pipeline. Therefore, GPUs can be used not only for conventional 3D graphics applications, but also for other purposes. Two of the most promising off-the-shelf applications using GPGPUs are image processing and computer vision, in that most of these applications require single instruction, multiple data (SIMD) style processing of image pixels and features, which are also common to computer graphics procedures.

SUMMARY OF THE INVENTION

Estimating the pose (location and orientation) of an object is a common task in many computer vision applications. Although many methods are known for pose estimation, most methods need manual initialization and are sensitive to illumination variation, appearance change, and partial occlusions.

The embodiments of the invention provide a method for estimating the pose of an object without manual initialization. The method matches the shape of the object obtained from a range image of a real-world scene with the shape of the object in a set of reference images obtained from a 3D model of the object at many different poses.

The method includes an error function to compare the range image and the reference images generated from the 3D model of the object at the different poses. The method uses data-parallel processing to evaluate and minimize the error function on many reference images in parallel.

A distribution of poses for the object is determined from the model of the object. A set of reference poses is selected according to the distribution, such that more reference poses are selected for more probable poses than less probable poses. The reference pose used to generate the reference image that best matches the range image is assigned as the pose of the object.

BRIEF DESCRIPTION OF THE DRAWINGS

FIG. 6 is a block diagram of pseudo code for a Euclidean distance transform according to an embodiment of the invention;

FIGS. 7-10 are block diagrams of the distance field for several iterations according to an embodiment of the invention;

FIGS. 11-13 are block diagrams of iterations for determining error values according to an embodiment of the invention;

FIGS. 20A and 20B are images of a spherical parameterization of the distribution of the poses of the object from two different viewpoints according to an embodiment of the invention;

FIG. 22A is an input range image and a reference range image with a closest matching rough pose estimate according to an embodiment of the invention;

FIG. 22B is an input range image and an image of the 3D model of the reference object determined from the reference range image in FIG. 22A according to an embodiment of the invention;

FIG. 22C is an image of the 3D model of the input object determined from the input range image in FIG. 22A according to an embodiment of the invention; and FIG. 22D is the input range image and the reference range image of FIG. 22A after refining the rough pose estimate according to an embodiment of the invention.

DETAILED DESCRIPTION OF THE PREFERRED EMBODIMENTS

Method and System Overview

Figure 1:
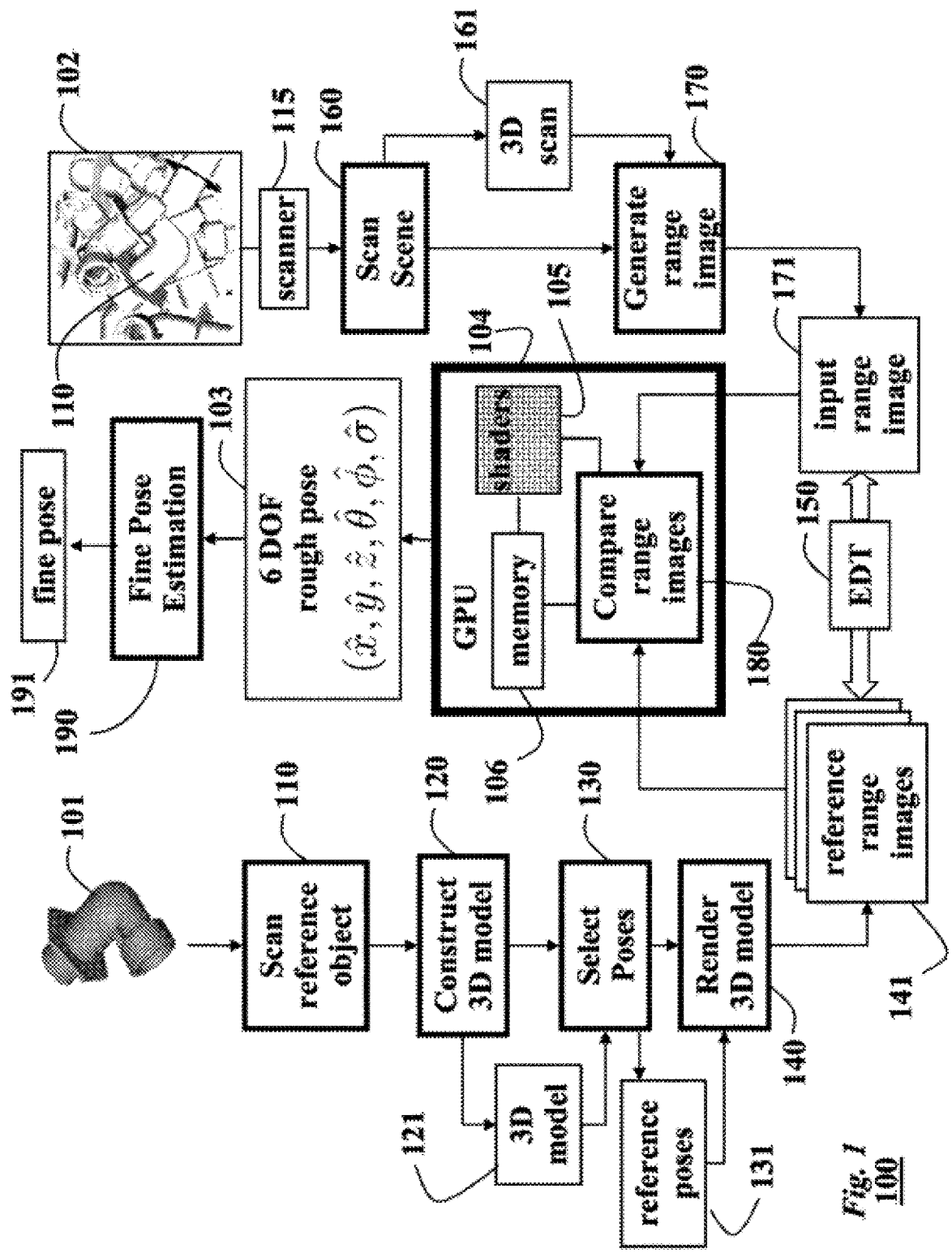
FIG. 1 is a flow diagram of a method for determining a pose of an object from a range image according to an embodiment of the invention.

FIG. 1 shows a method and system 100 for determining a pose of an object 110 according to embodiments of our invention. The method uses range images 171, reference images 141, and a 3D model 121 of the object.

The method is performed, in part, on a graphics processing unit (GPU) 104. The massive data-parallel processing on the GPU makes our method much simpler and more efficient than more complex general purpose computer based methods. Our method is fully automatic and does not require an initial estimate of the pose. Even though we compare several thousand reference images, the pose determination can be performed in real-time.

The pose can be used by other applications, for example, a robotic application that mechanically manipulates the object.

Preprocessing

During pre-processing, a reference object 101 is scanned 110 in detail to construct 120 a 3D model 121 of the reference object. The reference object 101 is identical to the input object 110. The model 121 can also be constructed 120 by other means, e.g., a computer-aided design (CAD) system. The model 121 can be in the form of a polygon mesh of vertices. Multiple poses of the reference object are selected 130. The model 121 is rendered 140 using the selected poses to produce a set of reference images 141.

In practice, we use thousands of reference images. Each reference image has 64×64 pixels. The set of reference images 141 can be stored in a memory 106 of the GPU 104. Associated with each reference image is the corresponding reference pose 131 of the reference object 101. The pre-processing steps are performed once.

We also can also apply edge detection, and a Euclidian distance transform (EDT) 150 to the reference range images 141. The EDT is described in greater detail below. The result is that our range images are represented as signed distance fields.

Online Processing

During online pose estimation, a scene 102, including the input object 110 and perhaps other known or unknown objects, is scanned 160 to produce a 3D scan 161. We use an active light method, e.g., a laser range scanner 115. Then, we apply a median filter to the 3D scan, edge detection to the smoothed image, and determine a distance field to generate 170 an input range image 171. Note we do not need to do the smoothing for the detailed scan 110 of the reference object because the scan data are substantially smooth.

The input range image 171 of the scene 102 is compared 180 with the set of reference images 141 to determine the six degrees-of-freedom (DOF) pose 103 of the top-most object 110 in the scene 102. By 'top-most,' we mean the object nearest to the scanner. In one embodiment, we use a parallel implementation of a downhill simplex procedure on the GPU 104.

The task is to find the best match between the reference images 141 and input range image 171 using error minimization of pairwise comparisons. The best matching reference image and its translation with respect to the input range image 171 yields our estimation of the 6-DOF pose $(\hat{x}, \hat{y}, \hat{z}, \hat{\theta}, \hat{\phi}, \hat{\sigma})$ 103 of the input object 110. Then, a fine pose estimation 190 can be performed, if required to obtain a fine pose 191.

We describe a novel error function that uses range values and Euclidean distance images. If grey scale or color values are available, then brightness or color gradients can also be taken into account in the error function. The error function can be evaluated per pixel, which makes the error function suitable for efficient processing in shader processors 105 of the GPU 104.

Conventionally, shaders are mostly used in computer graphics application and computerized games to produce graphic images from polygon models, e.g., a triangle mesh of vertices, textures, and lighting configurations. A fragment shader typically executes user-programmable GPU instructions for multiple pixels in parallel.

In contrast, our parallel shaders 105 determine object poses from reference images 141 and range images 171. To efficiently minimize the error in the pose, we provide a novel data-parallel version of the downhill simplex procedure that executes entirely on the GPU 104. A conventional simplex procedure is described by J. A. Nelder and R. Mead, "A simplex procedure for function minimization," The Computer Journal, 7(4), pp. 308-313, 1965, incorporated herein by reference. We adapt that procedure to execute in parallel on multiple pixels in the shader processors of the GPU.

The embodiments of our invention provide a simple error metric to compare the alignment of reference range images with the input range image on the GPU, a method for determining signed Euclidean distance transforms of images on the GPU, a data-parallel implementation of the downhill simplex procedure on the GPU, and an efficient implementation of model-based pose estimation for range images that does not require an initial estimate and that executes entirely on the GPU 104.

Range Image Processing

The processing steps described below can also be performed during the generation of the reference images 141. We start with the input 3D scan 161 of the scene and the 3D model 121 of the reference object 101. We use a range scanner 115. It should be noted that the scanner used for scanning the scene 102 can be of a much lower resolution that the scanner used to acquire the detailed reference scan used to construct the 3D model 121.

Both scan are projected orthogonally into the input range image 171, and the reference images 141, respectively. We select the view points of these orthogonal projections to be the same, making their viewing frustum and image resolution identical.

We know the scale factor between the physical units of the scanner, e.g., mms, to the unit distance of the 3D model 121. This information is readily available from scanner manufacturers. Consequently, the size of the reference object 101 is identical as the size of the object 110 in the input range image 171. Our method is not concerned about scale differences.

Figure 2:
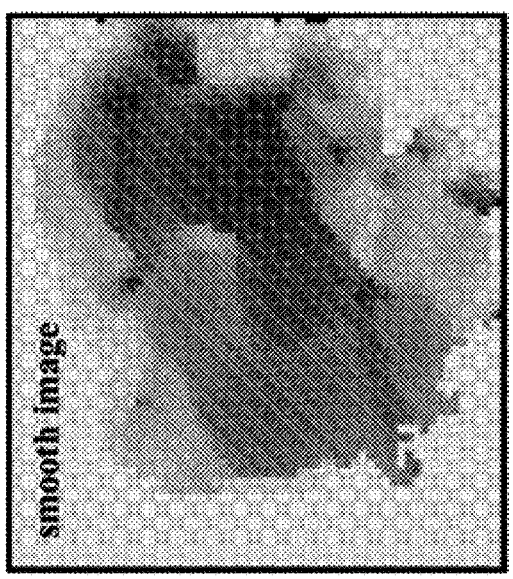
FIG. 2 is a depth image according to an embodiment of the invention.
Figure 3:
FIG. 3 is a smoothed depth image according to an embodiment of the invention.

FIG. 2 shows an example depth image. The scan is smoothed by applying a median filter with 3×3 mask implemented as a fragment shader. A fragment shader is user-programmable GPU code that is executed for multiple pixels in parallel on the GPU 104. FIG. 3 shows the smoothed image.

Figure 4:
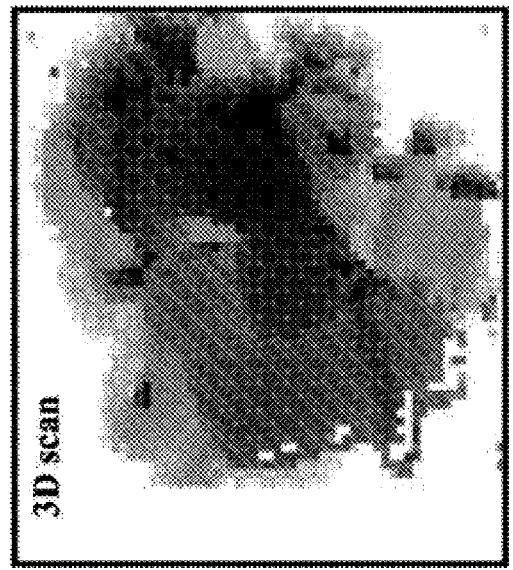
FIG. 4 is an edge image according to an embodiment of the invention.

In a second GPU rendering pass, we detect edges of the object by comparing range values of adjacent pixels in the smoothed image. If the range difference exceeds 4% of the image width, then the pixel is marked as a edge. The pixels detected as edges are marked with a binary bit for consecutive processing. The edge image is shown in FIG. 4.

Euclidean Distance Transform (EDT)

Next, we apply a signed Euclidean distance transform (EDT) 150 to the edge image. The transform assigns, to each pixel, a signed distance from that pixel to a nearest edge pixel. In one embodiment of the invention, the distance is the Euclidian distance. The EDT helps us to search for the best matching reference image by to constraining the search towards the edges of the object in the reference and input images. The edges and range values essentially define the shape of the object at a particular pose.

Figure 5:
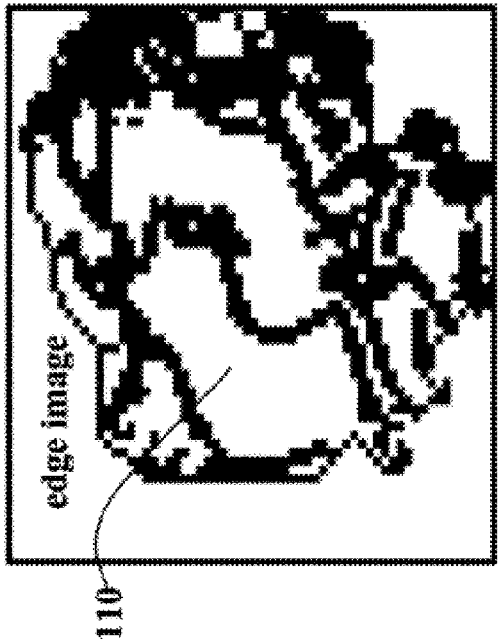
FIG. 5 is a distance field image according to an embodiment of the invention.

The EDT generates a distance field image as shown in FIG. 5. In the distance field image, pixels inside the object have positive distances, pixels outside the object have negative distance, and edge pixels have zero distances. As stated above, the reference range images 141 are also in the form of distance fields. That is, the distance field indicates the ranges (z) in the plane (x, y) of the image.

We perform the EDT using conventional "ping-pong" rendering, which uses two RGBA color-textures and consecutively switches their role as rendering source and target, respectively. In our GPU implementation, we use a 32-bit floating-point format for each processing channel. The values in the first two channels represent the Euclidian (x, y) coordinates of the nearest edge pixel located so far, the third channel stores the signed distance to the nearest edge pixel located so far, and the fourth channel indicates whether an edge pixel has been detected.

The distance field can then be combined with the range values in the scan to generate the input range image 171.

FIG. 6 shows the pseudo-code of our EDT procedure. The parameter m determines the number of iterations. The distance values are initialized to $-(m+1)$ for background (b) pixels, i.e., pixels with range values equal to 0, to $m+1$ for foreground (f) pixels, i.e., pixels with range values not equal to zero, and to zero for all edge (e) pixels. The first two color channels are initialized to the coordinates (x, y) of the pixel (p). During each iteration, the distance value of each pixel is compared to the values of its eight-connected neighboring pixels.

The distance value and coordinates of the current pixel p are updated if the distance from pixel p to the edge pixel e in an adjacent pixel n is smaller than the value saved at pixel p. This information is iteratively propagated over the entire image at each step.

Figures 7, 8, 9, 10:
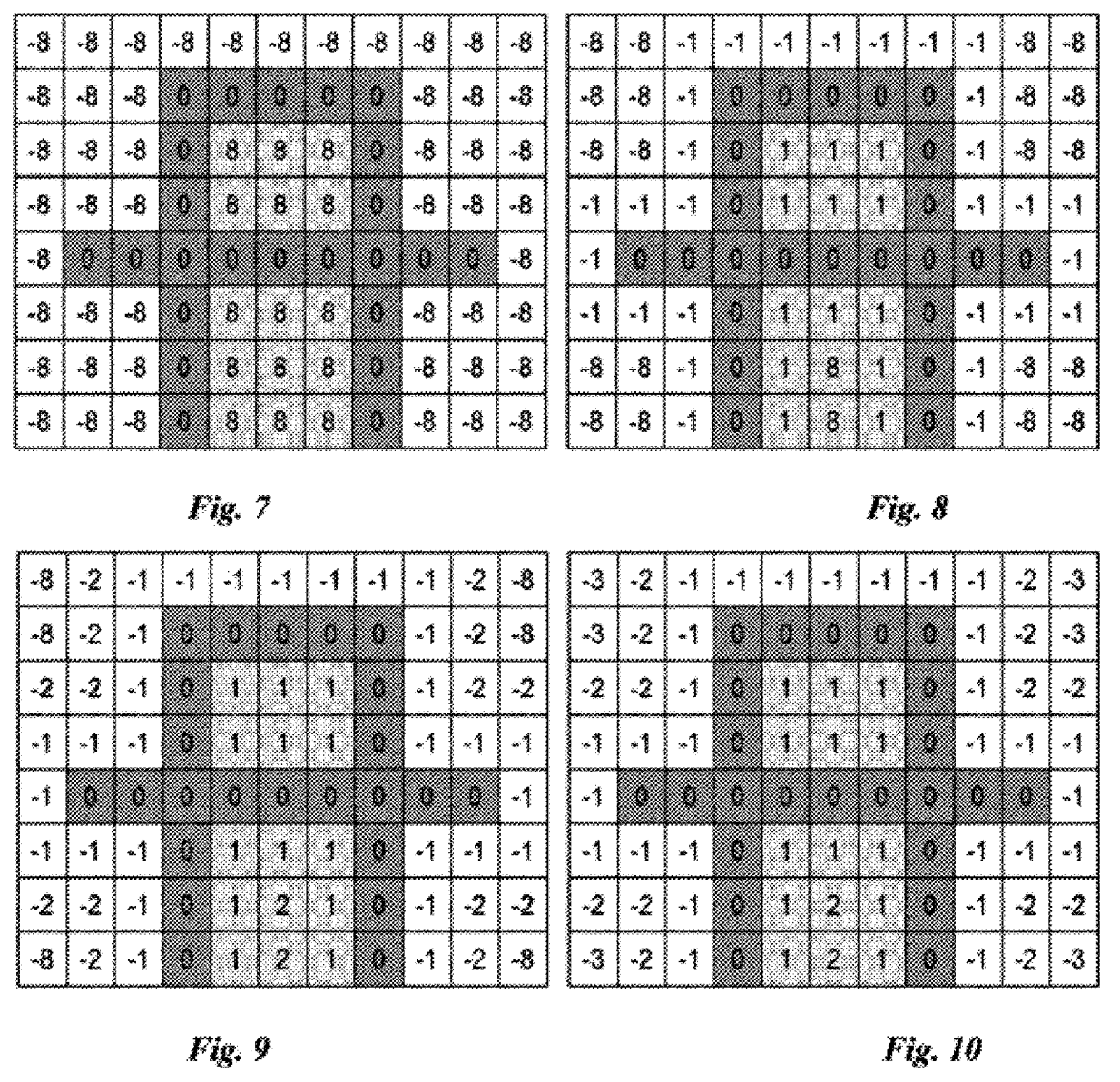

FIG. 7 shows the initialization step, and FIGS. 8-10 the next three iterations. The number of iterations m corresponds to the maximum distance of any pixel to its nearest edge. For full convergence, we can select m to be half the width of the image. However, to decrease processing time, we make use of the fact that the distance of each pixel to an object potential edge is typically much smaller. Our method does not require an exact distance field, an approximation is sufficient. We find empirically that m=7 is sufficient for the 64×64 images that we use.

Error Function

The error function we use to compare one of the reference range images $R_i$ 141 and the input range image I 171 is:

$$E_i(I, R_i, x, y, z) = r_i(E_{cover}(x, y) + \lambda E_{range}(x, y, z)),$$

where $$\begin{cases} r_i = \dfrac{A_i}{A_{max}} \\ E_{cover}(x, y) = \dfrac{\sum_{u,v} f(u, v)\delta_{cover}(u, v, x, y)}{\sum_{u,v} f(u, v)} \\ E_{range}(x, y, z) = \dfrac{\sum_{u,v} c(u, v)\delta_{range}(u, v, x, y, z)}{\sum_{u,v} c(u, v)}, \end{cases}$$

$E_{cover}(x, y)$ is a cover error, $E_{range}(x, y, z)$ is a range error, $\lambda$ is a weight, $r_i$ is a compensation term, $A_i$ is a foreground area of reference image $R_i$, $A_{max}$ is a maximum area among all reference range images, (u, v) are coordinates of pixels in the reference image $R_i$, f(u, v) is a normalization factor, $\delta_{cover}(u, v, x, y)$ is a cover difference, c(u, v) is a weighting factor, and $\delta_{range}(u, v, x, y, z)$ is a range difference.

The compensation term $r_i$ is the ratio of foreground area $A_i$ of the reference image $R_i$ to the maximal area $A_{max}$ among all the reference images. The compensation term indicates preference among the poses. That is, a more visible pose is preferred to a more occluded one even though $E_{cover}$ and $E_{range}$ may be similar.

The error terms are evaluated at each pixel at coordinates (u, v) in the input range image, see below. The translation values (x, y, z) of pixels in the reference range images $R_i$ 141 determine the position of the pixel with respect to the input range image I 171. The function uses a weight $\lambda$. The weight is summed over all image pixels (u, v), e.g., $\lambda=10$. The normalization and weighting factors, f(u, v) and c(u, v), make the error independent of the size of the object and the size of the image. The error is minimal if the reference image $R_i$ is aligned to a possibly partially occluded object in the input range image I 171.

Cover Error Term

The cover difference of a pixel (u, v) of the input range image I 171, and a pixel in the reference range image $R_i$ 141, translated by (x, y) is:

$$\delta_{cover}(u, v, x, y) = |EDT_I(u, v) - EDT_{R_i}(u-x, v-y)|,$$

where $EDT_I$ and $EDT_{R_i}$ are the EDT values of the input range image and reference range image, respectively.

The cover error normalization factor is:

$$f(u, v) = \begin{cases} 1 & \text{if } EDT_{R_i}(u, v) > 0 \\ 0 & \text{otherwise.} \end{cases}$$

The cover error is minimal when edges of the objects in the images I and $R_i$ match. We only consider non-background pixels with positive range values in the reference range image $R_i$.

Range Error Term

The range error compares range values of all pixels in the range images I and $R_i$ that overlap. The range difference is:

$$\delta_{range}(u, v, x, y, z) =$$
$$\begin{cases} |z_I(u, v) - (z_{R_i}(u - x, v - y) + z)| & \text{if } z_I(u, v) \neq 0 \wedge z_{R_i}(u - x, v - y) \neq 0 \\ 0 & \text{otherwise.} \end{cases}$$

The range error weighting factor is:

$$c(u, v) = \begin{cases} |\cos(\vec{V}, \vec{N}(u, v))| & \text{if } z_{R_i}(u, v) \neq 0 \\ 0 & \text{otherwise} \end{cases},$$

where $\vec{V}$ is a viewing vector of $R_i$ and $\vec{N}(u,v)$ is a surface normal vector at coordinates (u, v) in the reference range image.

The reference range image $R_i$ is translated by (x, y), and z is added to all range values of the reference range image $R_i$.

Implementation on the GPU

The error function is evaluated on the GPU 104 using the Compute Unified Device Architecture (CUDA) described above. In a simple implementation, all of the reference images are stored in the memory 106 and the number of threads computing in parallel on the GPU should be equal to the number of pixels in the reference range image. However, in this case, pixels in the background are simply stored in the memory without making any contribution to the error value. In our implementation, only a bounding box region $\hat{R}_i$ of the reference range images is transferred to the video memory. This reduces the amount of memory and the number of threads required and decreases the processing time.

In a first step, the input range image I 171 and the reduced size reference images $\hat{R}_i$ 141 are stored in the memory 106 of the GPU. A CUDA program issues a thread for each pixel, and each thread computes the error terms $E_{cover}$ and $E_{range}$ for the pixel. The current translation parameter (x, y, z) and the error values are stored in a separate header buffer. The score of each pixel is stored in a score buffer $S_i$ in the memory.

In a second step, pixel-wise errors are summed over all pixels of each reference range image, yielding the current error $E_i(I, R_i, x, y, z)$ for each reference image $R_i$. The computation is done using an in-parallel architecture. The number of simultaneous computations is maximized as follows.

Beginning with a step size s=1, the values of the pixels (u, v), (u+s, v), (u+s, v+s), (u, v+s) are added and stored at S(u, v). Subsequently, the size s is doubled for each iteration k, and the same procedure is repeated. The final result of the error function is stored at pixel $S_i(0, 0)$ after s=log(l) steps, where l is a width of the image in pixels. A simple example for an 8×8 image is shown schematically in FIGS. 11-13.

In each iteration k, information at the current pixel (stippled) 204 is collected from the upper left (horizontal) 201, upper right (vertical) 202, and right (diagonal) 203 neighboring pixels at distance s=2k. The final result of the error function is stored at pixel (0, 0) 204 after s=log(l) steps 210, where l is the width of the image in pixels. This procedure is very efficient for square images.

Parallel Optimization Framework

The goal of the error optimization is to determine the pose 103

$$(\hat{x}, \hat{y}, \hat{z}, \hat{\theta}, \hat{\phi}, \hat{\sigma})$$

that globally minimizes the error between the input and reference range images. Thus, we are solving the following 6-DOF optimization problem:

$$(\hat{x}, \hat{y}, \hat{z}, \hat{\theta}, \hat{\phi}, \hat{\sigma}) = \underbrace{\operatorname*{argmin}_i \left( \underbrace{\min_{x,y,z} E_i(I, R_i, x, y, z)}_{\text{step 1}} \right)}_{\text{step 2}}$$

where $R_i$ is a reference image of the 3D model rendered with rotation angles ($\theta$, $\phi$, $\sigma$).

Step 1 determines the error between each reference image and the input range image using the downhill simplex procedure for the translation values (x, y, z), see Nelder et al.

Step 2 selects the associated pose 131 of the reference range image $R_i$ with the lowest global error. The result is the estimated pose $(\hat{x}, \hat{y}, \hat{z}, \hat{\theta}, \hat{\phi}, \hat{\sigma})$ 103 of the input object 110 in the scene 102.

Figure 14:
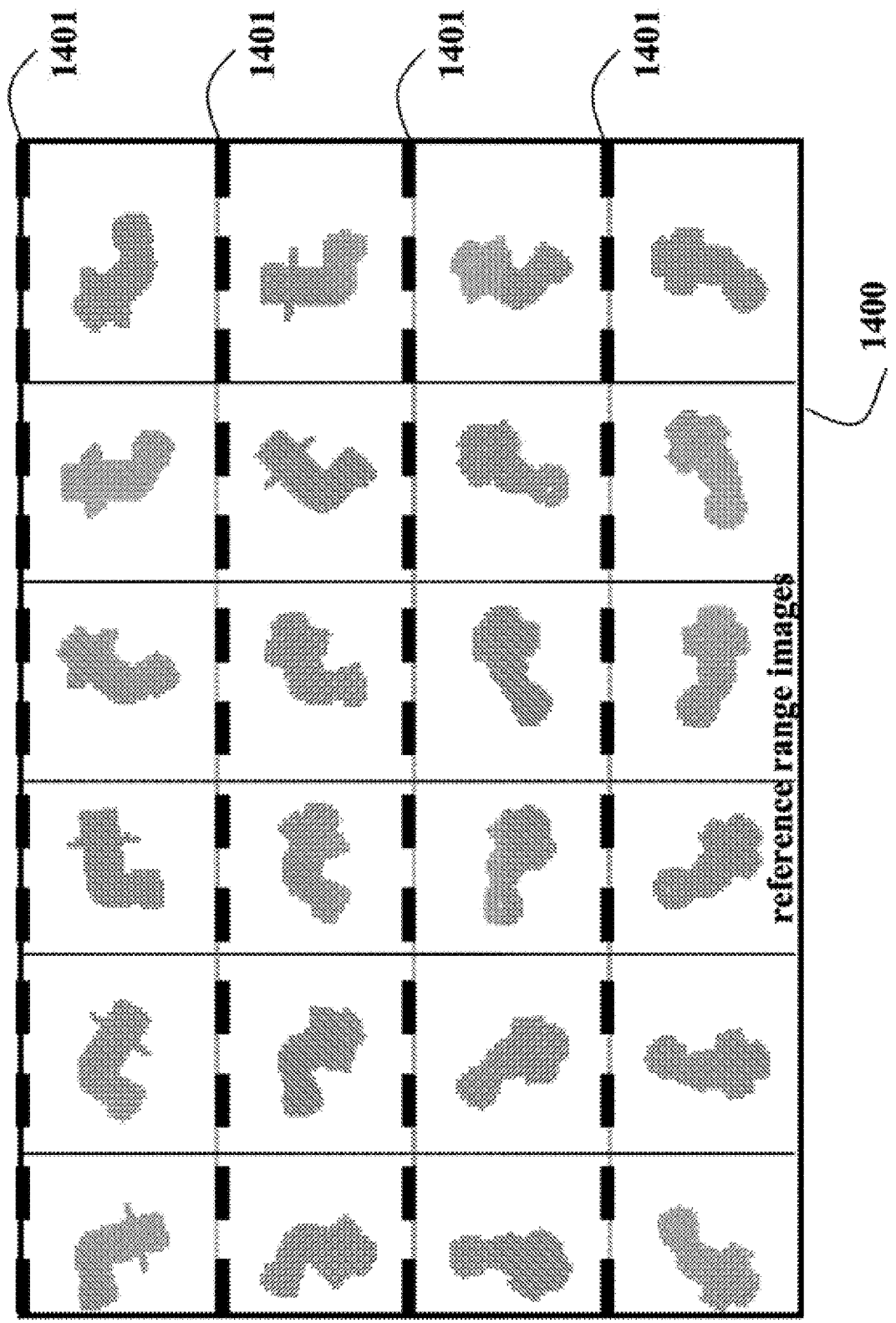
FIG. 14 is a diagram of reference range images stored as a matrix according to an embodiment of the invention.

As shown in FIG. 14, during pre-processing, we determine one large reference matrix 1400 to store all the reference images. The number of reference images influences the precision and speed of our pose estimation method. The more reference images we store, the better our angular pose estimate and the slower the method. The number of reference images that can be stored also depends on a size of the memory 106.

To address this issue, we use a greedy simplex procedure. We render the object using orthonormal projections to obtain the reference range images 141. Then, we rotate the object by ($\theta$, $\phi$, $\sigma$) with very small rotation increments, e.g., five degrees to produce a different pose. For each new reference image, we compute the error according to Equation (1) with respect to all previously stored reference images. If the error is larger than a user-defined threshold, then we add the range image to the reference matrix. Because we do not replace, but only add reference images, we only have to execute the simplex procedure a small number of times with larger and larger thresholds, until we have stored all range images in the reference matrix.

Adaptive sampling of the pose space of the reference object is described in detail below. An embodiment of the invention samples the pose space of the reference object according to a distribution of poses. More poses of the reference object are selected regions of higher pose probability according to the distribution of poses of the reference object than in regions of lower pose probability.

Initial Parameters

Figure 16:
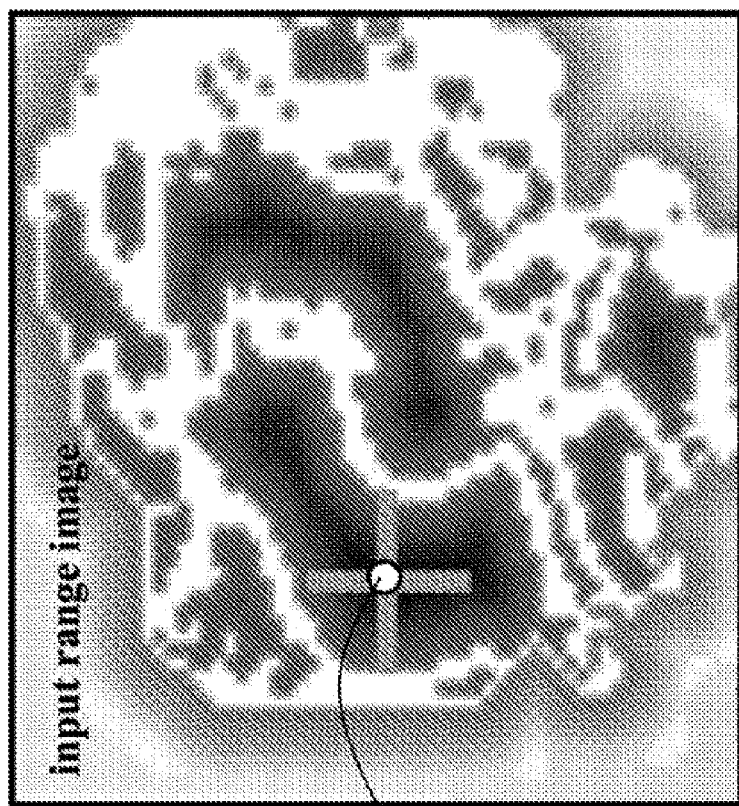
FIG. 16 is an input range image according to an embodiment of the invention.
Figure 15:
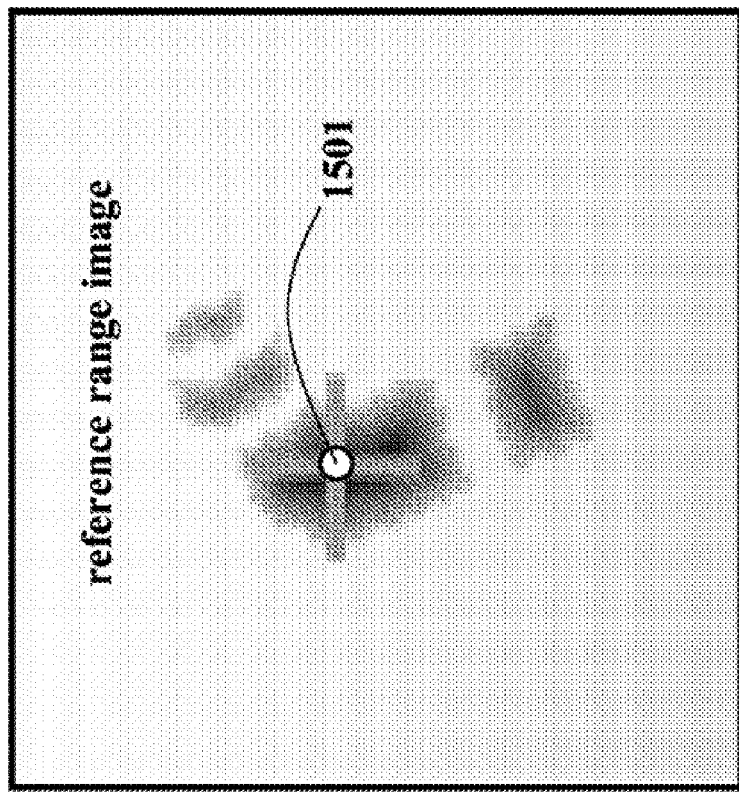
FIG. 15 is a reference range image according to an embodiment of the invention.

The number of iteration steps for convergence of the downhill simplex procedure can be drastically reduced by selecting appropriate initial parameters. Because the simplex procedure can terminate at a local minimum, we estimate the initial parameters $(x_0, y_0, z_0)$ by locating pixels 1501 and 1601 in the images $R_i$ and I, respectively, that correspond to the topmost and most visible object, as shown in FIGS. 15 and 16.

Instead of finding points 1501 and 1601 in the pixel domain directly, we try to find a surface patch in each of the range images that is superior according to the above criteria. The EDT and depth values are used for this purpose. Among the segmented patches, a patch P with a minimal average depth is selected first. This patch is normally close to the scanner and unoccluded. Then, a pixel p∈P, where the EDT value is maximal inside P, is selected as the initial point. In our approach, multiple initial points can be chosen concurrently to increase the accuracy of our pose estimation. If performance is the most important factor, then a single initial point may be used. It takes approximately 20 to 30 iterations for the downhill simplex procedure to converge for a single start point.

Data Parallel Downhill Simplex on the GPU

To parallelize the downhill simplex procedure for the GPU 104, an additional scan-line 1401 is added to each reference image in the reference matrix 1400, see FIG. 14. We use these scan lines to store the parameters of the downhill simplex procedure and the error values in different color channels.

The vertices of the simplex are initialized to $(x_0, y_0, z_0)$, $(x_0+d, y_0, z_0)$, $(x_0, y_0+d, z_0)$ and $(x_0, y_0, z_0+d)$, where $x_0$, $y_0$ and $z_0$ are the initial translation parameters described above. We determine empirically that the value for the optimal step size d is 5% of the image width, in terms of pixels.

The optimization procedure is implemented using three CUDA programs. The first program implements the downhill simplex procedure as described by Nelder et al. The second program determines the error terms, and the third program determines the final error value. This procedure is executed for each of the reference range images 141. Finally, the topmost scan lines of all reference images are read from the GPU. The pose $(\hat{x}, \hat{y}, \hat{z}, \hat{\theta}, \hat{\phi}, \hat{\sigma})$ 131 of the object associated with the reference image with the lowest error is the pose 103 of the object.

Adaptive Sampling of Pose Space

Reference images 141 of the model 121 in a number of different reference poses 131 are rendered 140 using the 3D model 121 of the object 101. The number and selection 130 of reference poses 131 influences the precision and speed of our pose estimation method 100. The more reference images 141 we store, the better our rough pose estimate 103 and the slower the method. The number of reference images 131 that can be stored also depends on a size of the memory 106.

The simplest way of selecting 130 the reference poses 131 is to sample the pose space uniformly. However, this often leads to an inefficient sampling if the distribution of probable poses of an object has a non-uniform density. The following sections describe a method for adaptively constructing the reference images. Note that the term pose space as used in these sections includes every possible orientation. A distribution of poses, determined using the model 121 of the object 101, approximates the density of a pose space using 'a very large number' of probable poses of the model. The distribution of poses guides the sampling of the pose space.

Distribution of Poses

Figure 17B:
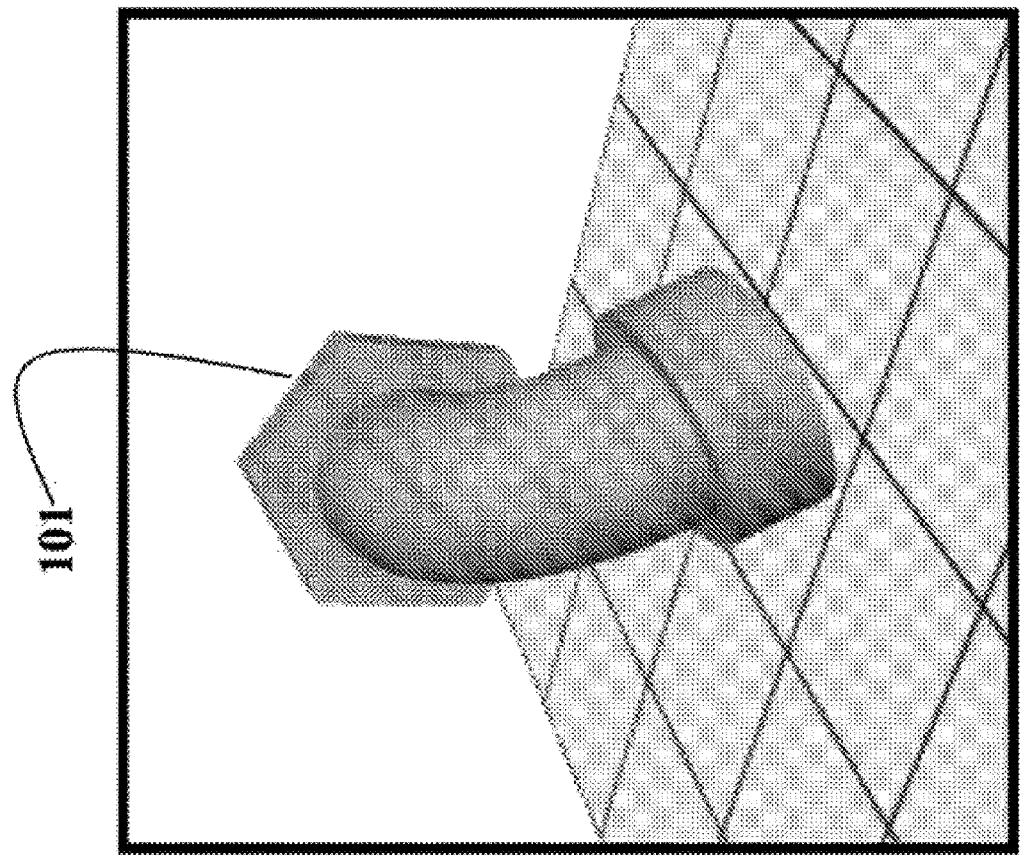
FIG. 17B is an image of an object in a less probable pose according to the distribution of the poses of the object according to an embodiment of the invention.
Figure 17A:
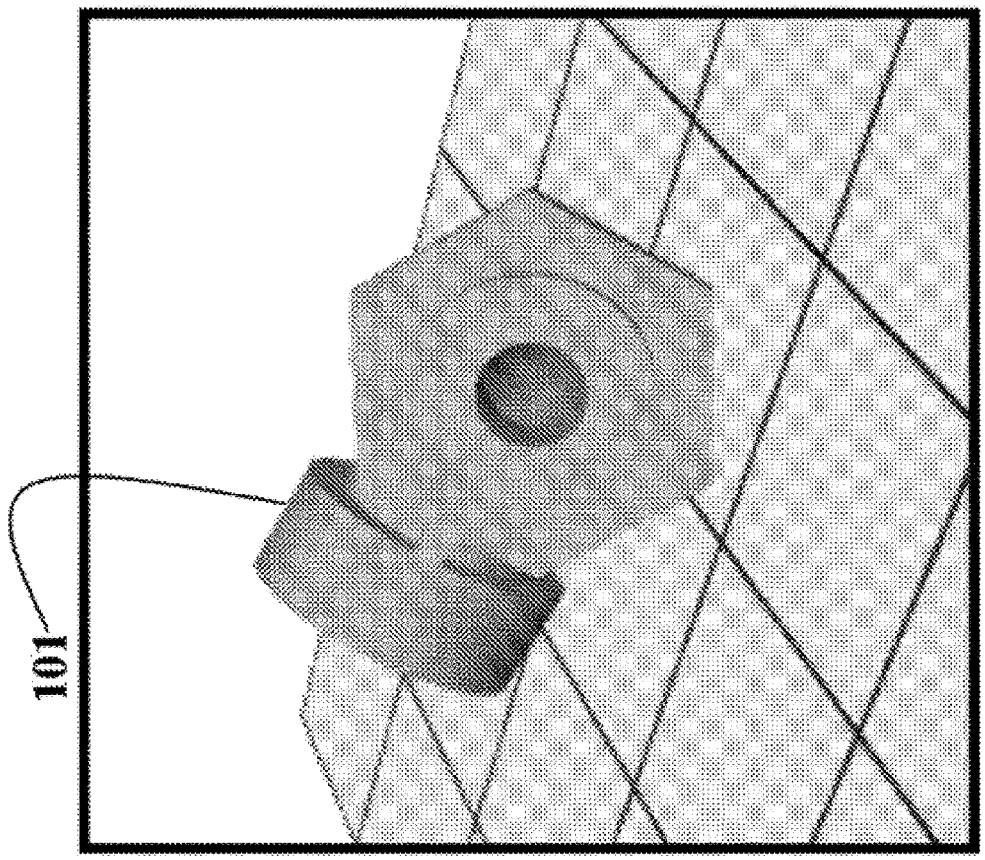
FIG. 17A is an image of an object in a more probable pose according to the distribution of the poses of the object according to an embodiment of the invention.

Reference pose selection 130 is performed for a virtual scene of stacked 3D objects in a bin. Because the shape of many practical 3D objects is irregularly symmetric, e.g., see the elbow pipe joint 101, such objects, when stacked in the bin, tend to have a pose closely resembling their stable resting pose. For example, the resting pose of the object 101 shown in FIG. 17A would be more frequent than the erect pose of the object 101 shown in FIG. 17B. Based on this observation, the invention adaptively samples the pose space of the object according to a distribution of probable poses to select 130 reference poses 131 of the object 101. More reference poses are selected for more probable poses than less probable poses.

In our data-driven framework, the distribution is estimated by simulating object stacking in a physics-based virtual bin using the 3D model of the object. In the virtual bin simulation, 3D objects are randomly dropped into the bin until the bin is full of the objects. The collisions (both model-to-model and model-to-walls) are simulated using, for example, the PhysX™ physics library. In order to acquire sufficient data for estimating the PDF, the stacking of 35,000-40,000 objects is repeated for several hundred empty bins.

Figure 18:
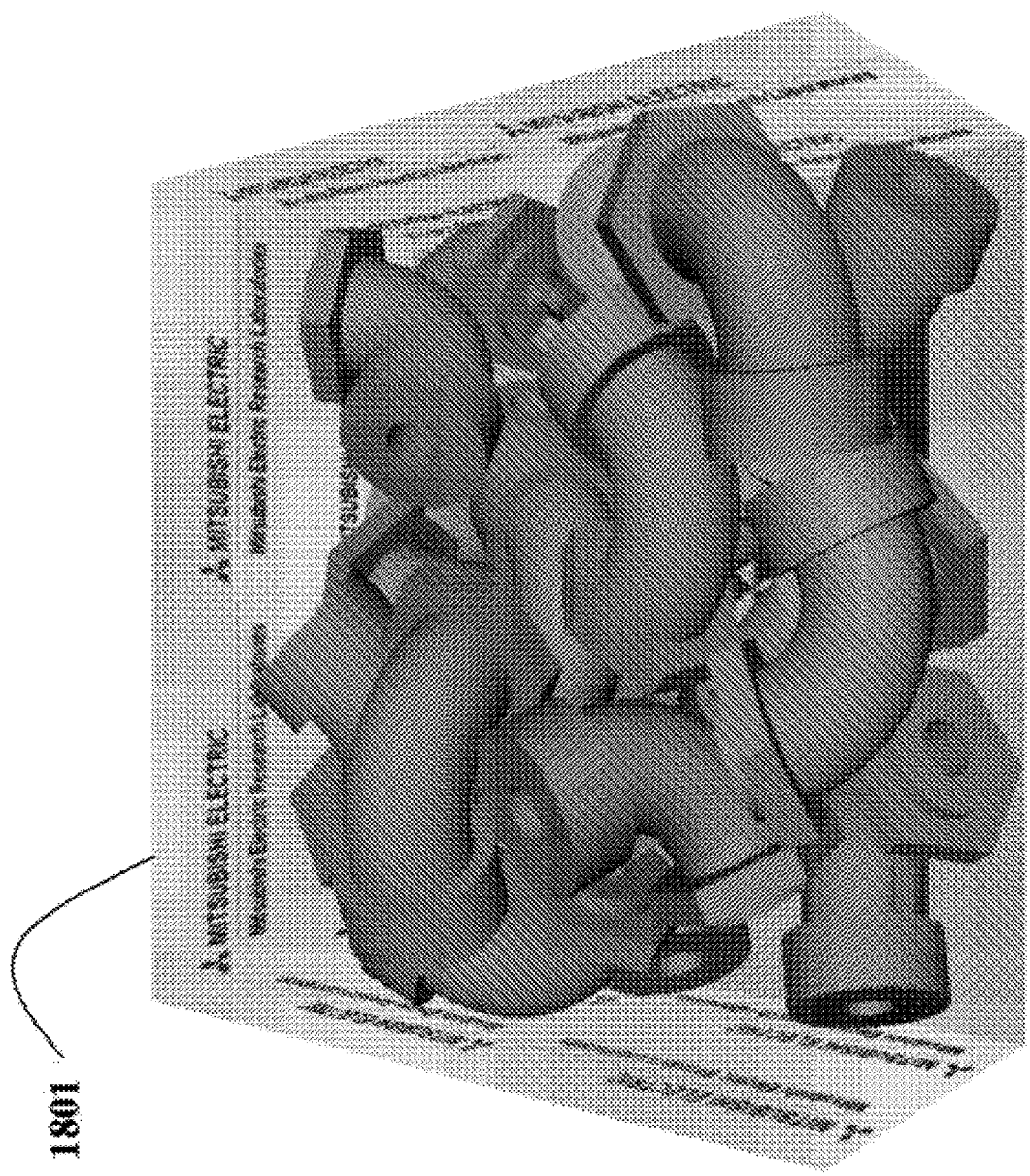
FIG. 18 is an image of a virtual bin according to an embodiment of the invention.
Figure 19A:
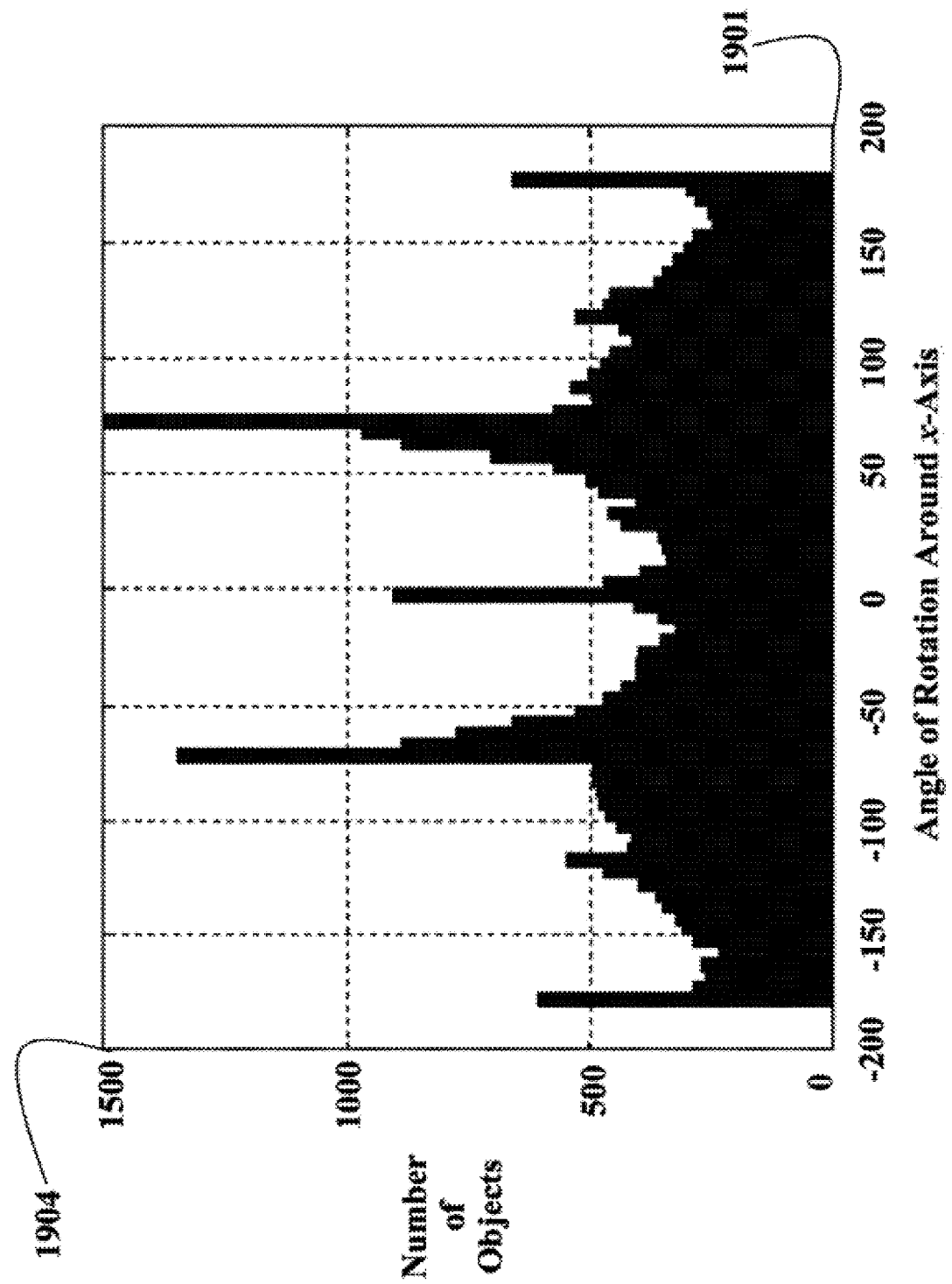
FIGS. 19A-C are histograms of pose angles determined using a 3D model of the object according to an embodiment of the invention.
Figure 19B:
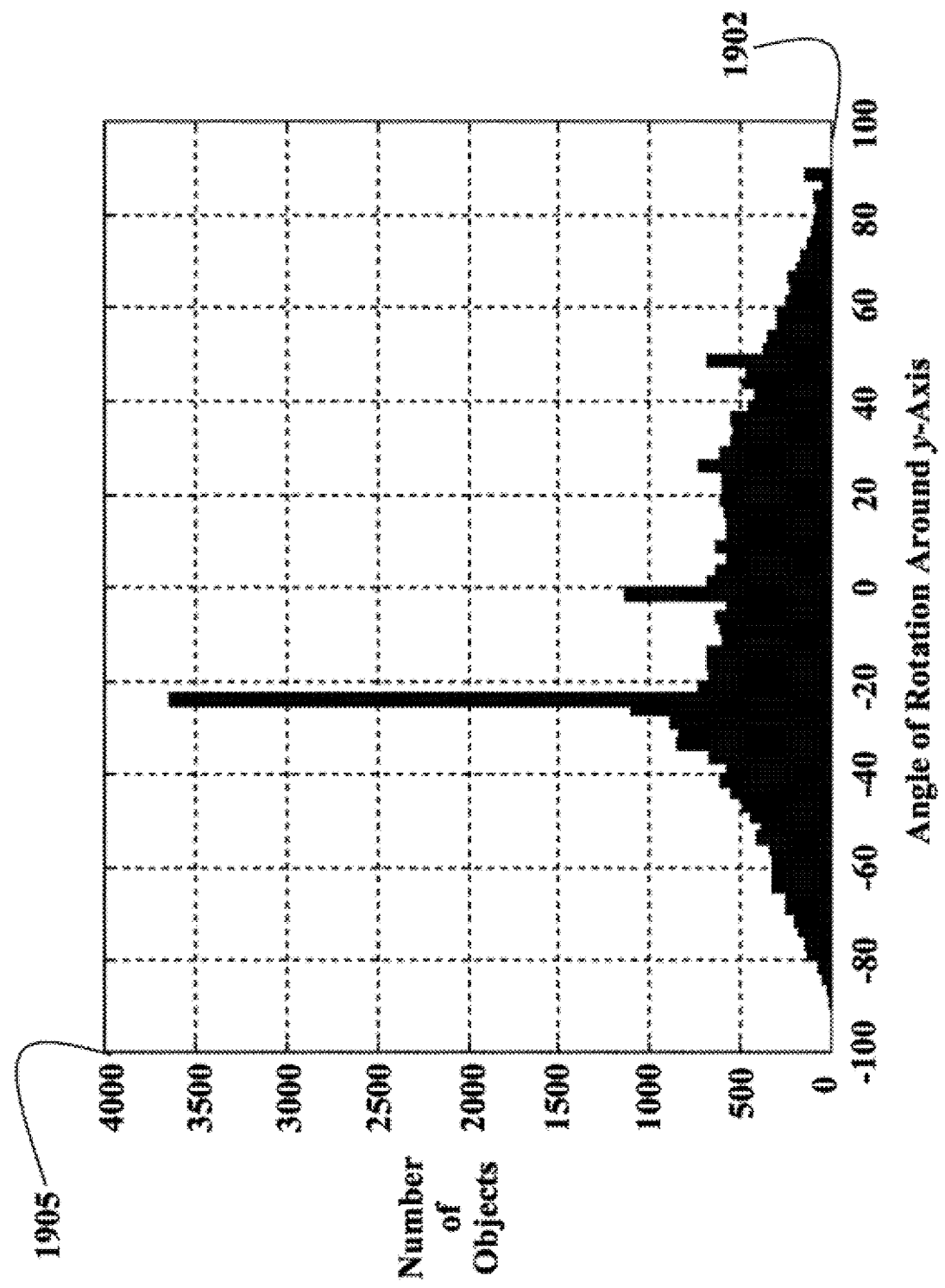
Figure 19C:
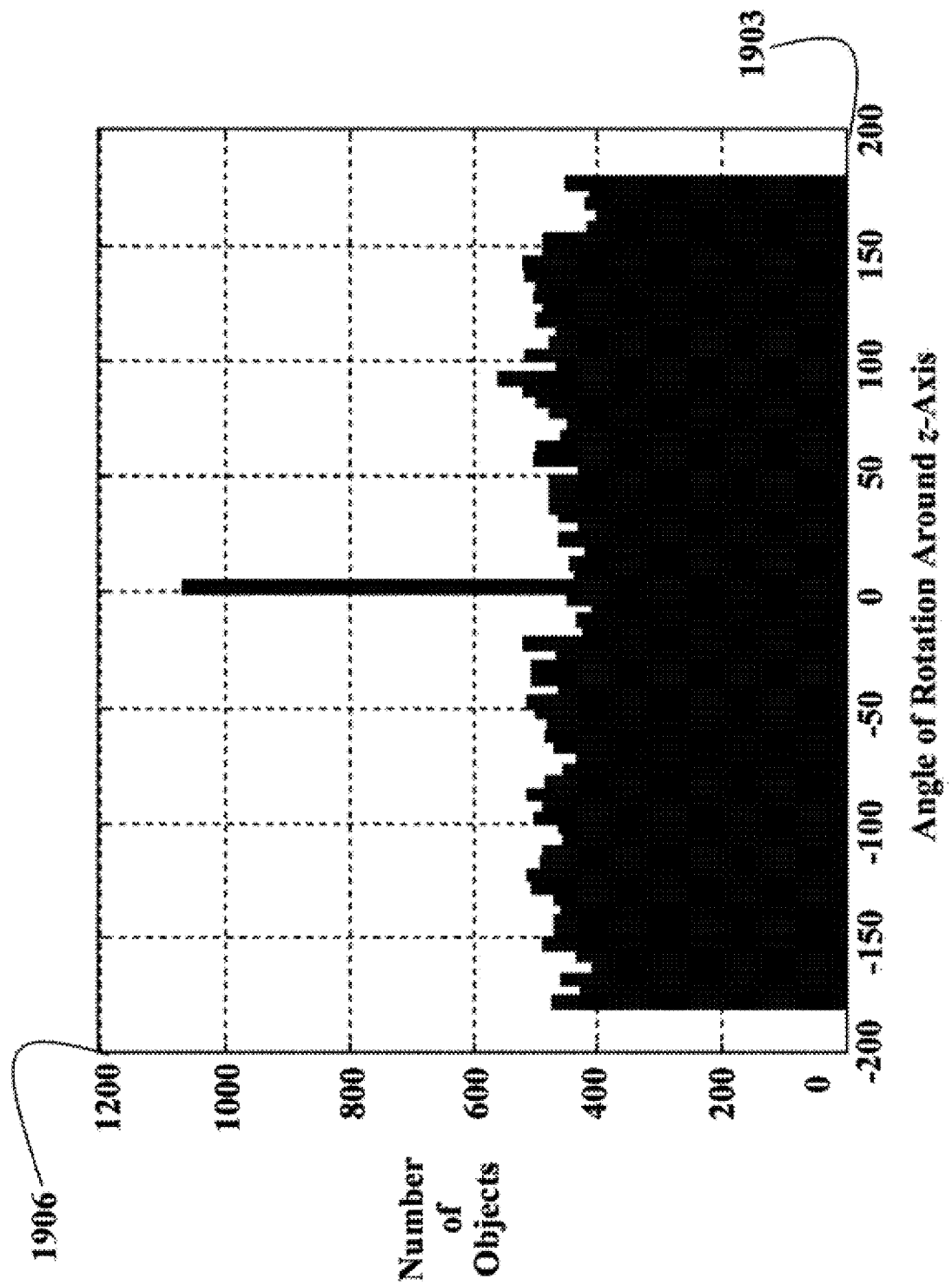

FIG. 18 shows an example of a virtual bin 1801. The resulting non-uniform distribution of the poses of the object is clearly shown in the histograms of FIGS. 19A-C, in which the pose histograms are depicted in terms of three Euler angles, i.e., rotation around the x-, y-, and z-axes). In FIGS. 19A-C, the horizontal axes 1901-1903 are rotation angles around the x-, y-, and z-axes in degrees, respectively, and the vertical axes 1904-1906 are number of objects for each rotation angle.

We use a spherical parameterization, i.e., azimuth, elevation, and inplane rotation $(\theta, \phi, \sigma)$ of the pose. A spherical parameterization 2000 of the histograms in FIGS. 19A-C is shown in FIGS. 20A and 20B from two different viewpoints of the spherical parameterization. The difference between the dense pose regions 2001 and the sparse pose regions 2002 is easily distinguishable. In the embodiments of the invention, the density of the pose space is expressed in terms of the distribution of the poses of the object.

Sampling Poses using K-Means Clustering

Figure 21A:
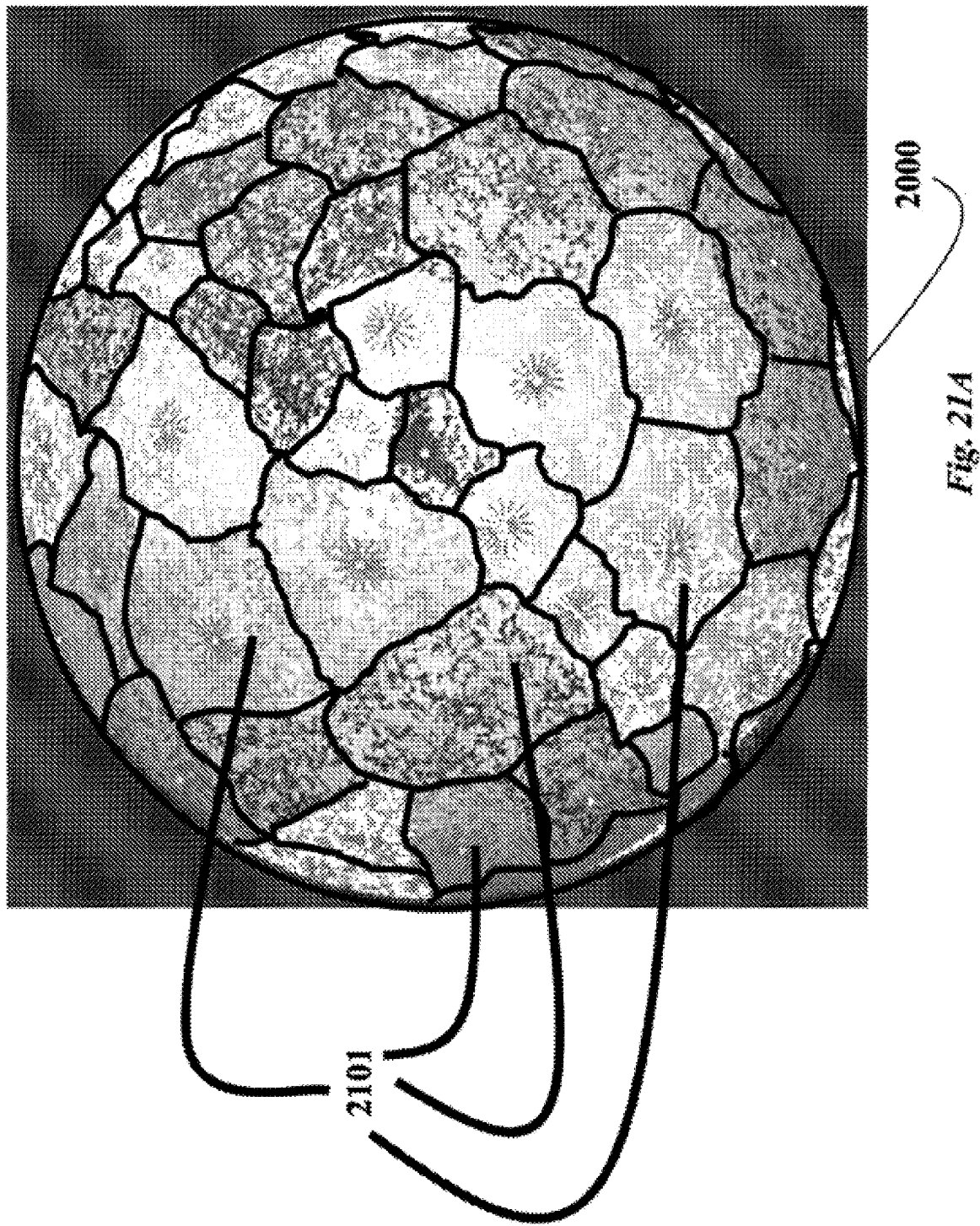
FIG. 21A is an image of the spherical parameterization of FIG. 20A showing the result of a first clustering step according to an embodiment of the invention.
Figure 21B:
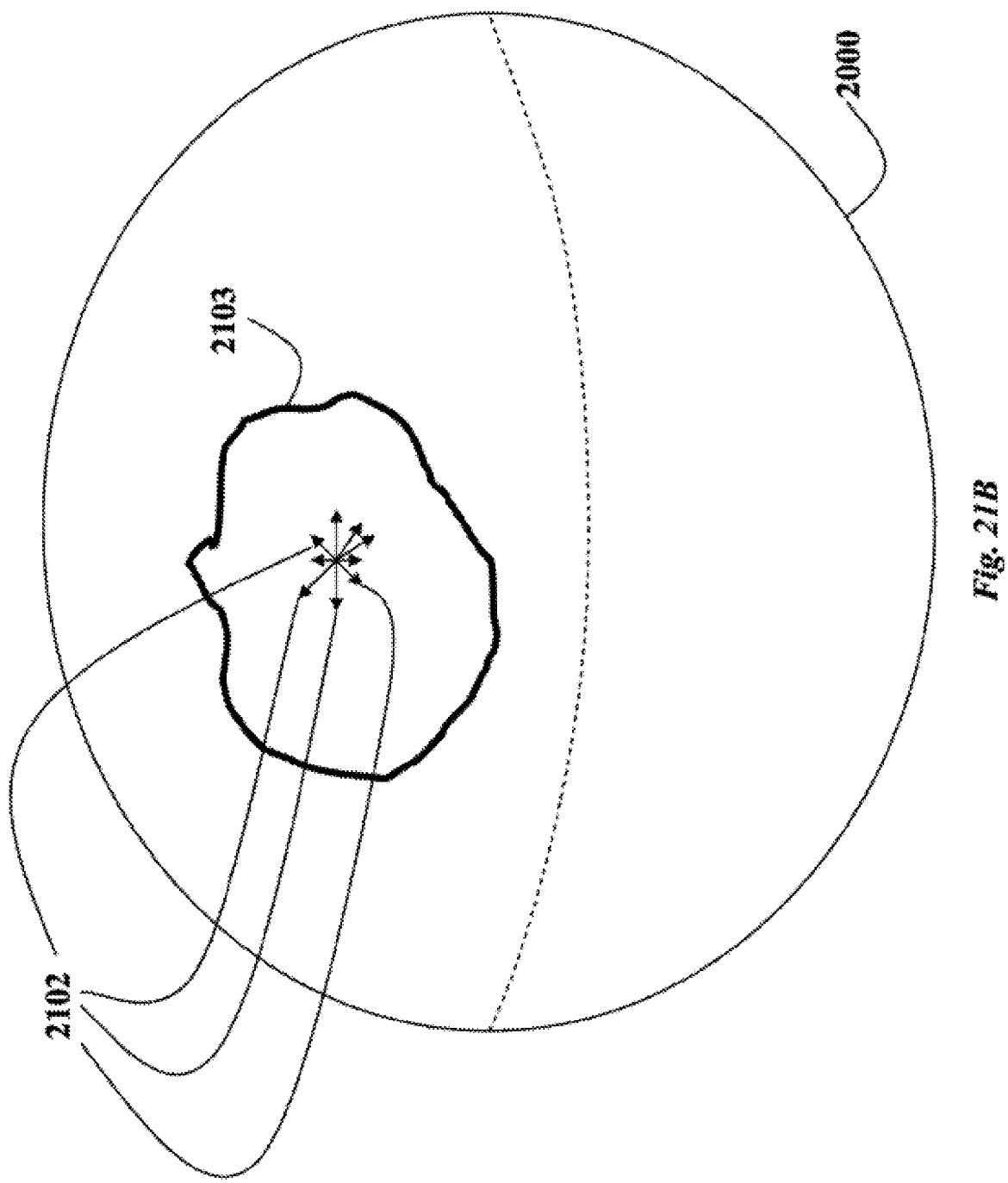
FIG. 21B is an image of the spherical parameterization of FIG. 20A showing the result of a second clustering step for one cluster determined in the first clustering step according to an embodiment of the invention.

In order to sample the pose space represented by the spherical parameterization 2000, K-means clustering is employed. Because the distribution of poses is dense, and it is more intuitive to define a distance in Euclidian space, the first step of clustering is performed for the azimuth and elevation angles. The result of clustering for the poses in FIG. 20A is shown in FIG. 21A. For each cluster 2101, a second clustering step is done for the inplane rotation angles. The result is shown in FIG. 21B as arrows 2102 for a single cluster 2103.

The number of clusters, $K_1$ and $K_2$, is proportional to the ranges of the parameters. For example, if the number of reference poses used in the pose estimation method 100 is 2048, then $K_1$ and $K_2$ should be 128 (=16×8) and 16, respectively, because the parameter range of the azimuth and inplane rotation angle is $[0, 2\pi]$, while that of elevation angle is $[0, \pi]$.

Figure 21D:
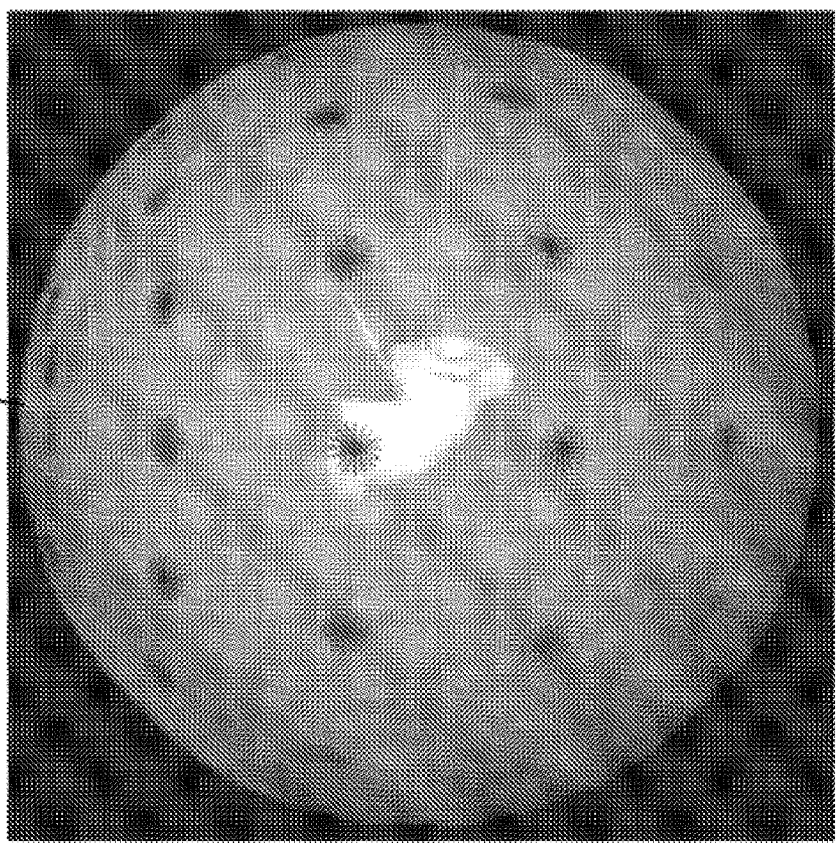
FIG. 21D is an image of the spherical parameterization of FIG. 20A showing the result of uniform sampling according to an embodiment of the invention.
Figure 21C:
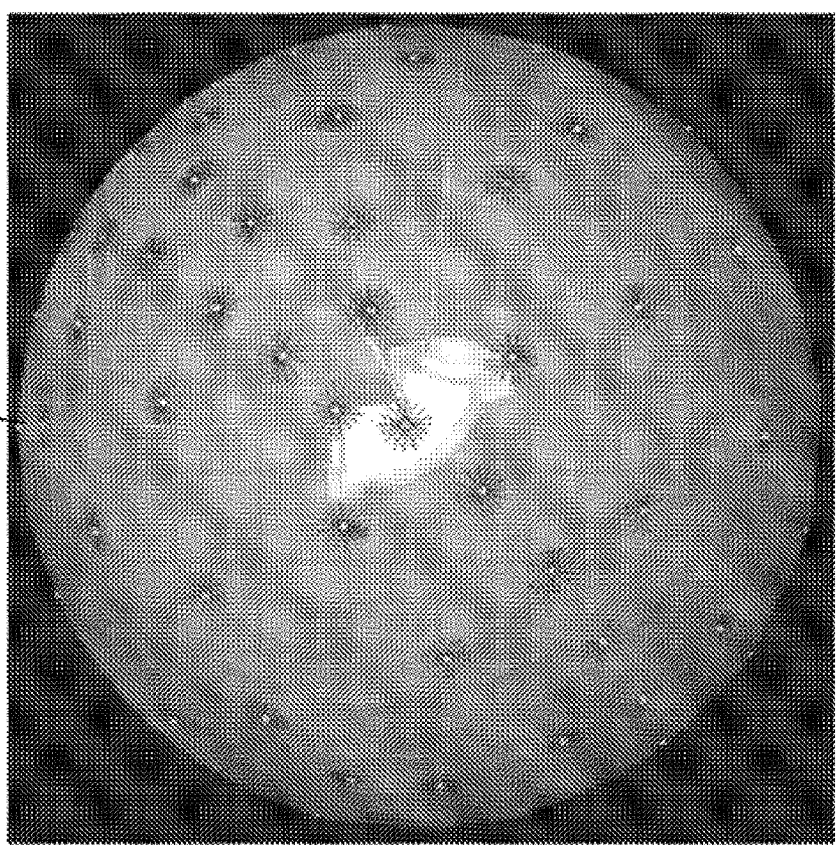
FIG. 21C is an image of the spherical parameterization of FIG. 20A showing the result of adaptive sampling according to an embodiment of the invention.

The result of adaptive sampling of the pose space is illustrated in FIG. 21C. As shown in FIG. 21C, more reference poses are placed in the dense pose regions of the spherical parameterization of the poses 2000, unlike the uniform sampling of Euler angles 2010 shown in FIG. 21D.

Symmetry

When the shape of the object has rotational symmetry, the pose space is also symmetric. Pose symmetry can be defined as follows. If there exists a rotation axis X, and an angle $\theta$ ($<2\pi$), such that a pose rotated around X by $\theta$ is exactly same as the original pose, then the pose space is symmetric. For example, if X is the x-axis and $\theta$ is $\pi$, then the pose space is reduced to either one of the hemispheres divided by the xz plane.

If the object has pose symmetry, the effective pose space is reduced at least in half. Therefore, more reference poses can be placed in the reduced pose space or the number of reference poses can be reduced. Compared with determining reference poses without considering symmetry, this results in more accurate pose estimation or reduced processing time in the matching process while maintaining the same accuracy. Pose symmetry can be manually indicated and applied during K-means clustering.

Fine Pose Estimation

The result of our pose estimation method 100 can have a small angular error. If the reference image 141 generated using rough pose 103 and the range image 171 are almost aligned, the ICP procedure works well to transform 190 from the rough pose 103 to a more accurate fine pose 191. A naïve approach is to apply ICP for the mesh models of the range image and the 3D model of the object and to use the rough pose 103 as the initial parameter. However, because the surface triangle density of the two meshes is usually different and the mesh of the 3D model is often irregular with many elongated triangles, this usually does not work correctly.

The ICP procedure is shown schematically illustrated in FIGS. 22A-D. In our method, we use the rough pose 103 as shown in FIG. 22A. The reference image 2202 is closely aligned with the object in the range image 2201. As shown in FIG. 22B, instead of using the 3D model of the object, we use a partial mesh model of the object 2203, which is obtained using the rendered reference image 2202 of the 3D model with the rough pose 103. The partial mesh model 2204 of the input object in the input range image is shown in FIG. 22C. The triangular resolutions of the meshes of the range image and the reference images are now equivalent. In addition, both are partial meshes of the whole object and there is significant overlap, which is typical input for a successful ICP procedure. After running ICP, the resultant pose, i.e., the fine pose 2205, is almost exactly matched with the range image.

EFFECT OF THE INVENTION

Our method determines a pose of an object from reference and range images and exploits the parallelism of GPUs. We can locate the object in a complex scene and can correctly estimate its pose without an initial pose estimate. Our method is not affected by local minima because we compute the errors for all the reference images and then select the best matching reference image for the pose determination.

Adaptive sampling of a pose space of an object is provided. Embodiments of the invention adaptively sample the pose space of the object according to a distribution of probable poses. More reference poses are selected for more probable poses than less probable poses.

The result of our pose estimation method can be refined to a more accurate pose. The ICP procedure works well to transform a rough pose to a more accurate fine pose.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a pose of an object from a range image, comprising the steps of:
   determining a distribution of poses for an object, in which the distribution is determined from a model of the object;
   selecting a set of reference poses according to the distribution, such that more reference poses are selected for more probable poses than less probable poses;
   generating a reference image for each reference pose; and
   assigning the reference pose used to generate the reference image that best matches a range image including the object as the pose of the object, wherein the assigning uses an error function:

$$E_i(I, R_i, x, y, z) = r_i(E_{cover}(x, y) + \lambda E_{range}(x, y, z)),$$

where $$\begin{cases} r_i = \dfrac{A_i}{A_{max}} \\ E_{cover}(x, y) = \dfrac{\sum_{u,v} f(u, v)\delta_{cover}(u, v, x, y)}{\sum_{u,v} f(u, v)} \\ E_{range}(x, y, z) = \dfrac{\sum_{u,v} c(u, v)\delta_{range}(u, v, x, y, z)}{\sum_{u,v} c(u, v)}, \end{cases}$$

I is the range image, $R_i$ is a particular reference image, (x, y, z) is a translation, $E_{cover}(x, y)$ is a cover error, $E_{range}(x, y, z)$ is a range error, $\lambda$ is a weight, $r_i$ is a compensation term, $A_i$ is a foreground area of $R_i$, $A_{max}$ is a maximum area among all reference range images, (u, v) are coordinates of pixels in $R_i$, f(u, v) is a normalization factor, $\delta_{cover}(u, v, x, y)$ is a cover difference, c(u, v) is a weighting factor, and $\delta_{range}(u, v, x, y, z)$ is a range difference, wherein the steps are performed in a processor.

2. The method of claim 1, in which the model is constructed using an active light system.

3. The method of claim 1, in which the model is constructed using a computer-aided design system.

4. The method of claim 1, further comprising:
   simulating object stacking in a physics-based virtual bin using the model to determine the distribution.

5. The method of claim 1, further comprising:
   constructing a spherical parameterization of the distribution; and
   sampling adaptively the spherical parameterization to select the set of reference poses.

6. The method of claim 5, in which the sampling is performed using K-means clustering.

7. The method of claim 5, in which a reduced spherical parameterization is sampled adaptively if the object has a rotational symmetry.

8. The method of claim 1, in which the cover error is minimal when edges of the object in the range image I and the reference image $R_i$ match.

9. The method of claim 1, in which the cover difference is $$\delta_{cover}(u,v,x,y)=|EDT_I(u,v)-EDT_{R_i}(u-x,v-y)|,$$

where $EDT_I$ and $EDT_{R_i}$ are Euclidean distance transform values of the range image I and the reference image $R_i$, respectively.

10. The method of claim 9, in which the normalization factor is $$f(u, v) = \begin{cases} 1 & \text{if } EDT_{R_i}(u, v) > 0 \\ 0 & \text{otherwise.} \end{cases}$$

11. The method of claim 1, in which the range error is minimal when depth values in the range image I and the reference image $R_i$ are similar.

12. The method of claim 1, in which the range difference is $$\delta_{range}(u, v, x, y, z) =$$

-continued
$$\begin{cases} |z_I(u, v) - (z_{R_i}(u-x, v-y) + z)| & \text{if } z_I(u, v) \neq 0 \wedge z_{R_i}(u-x, v-y) \neq 0 \\ 0 & \text{otherwise.} \end{cases}$$

where $z_I$ and $z_{R_i}$ are depth images of the range image I and the reference image $R_i$, respectively.

13. The method of claim 12, in which the weighting factor is $$c(u, v) = \begin{cases} |\cos(\vec{V}, \vec{N}(u, v))| & \text{if } z_{R_i}(u, v) \neq 0 \\ 0 & \text{otherwise} \end{cases},$$

where $\vec{V}$ is a viewing vector of $R_i$ and $\vec{N}(u, v)$ is a surface normal vector at $(u, v)$.

14. The method of claim 1, in which the best match minimizes the error function $$(\hat{x}, \hat{y}, \hat{z}, \hat{\theta}, \hat{\phi}, \hat{\sigma}) = \underset{i}{\operatorname{argmin}} \underbrace{\left( \underbrace{\min_{x,y,z} E_i(I, R_i, x, y, z)}_{\text{step 1}} \right)}_{\text{step 2}},$$

where $R_i$ is a particular reference image of the model rendered with rotation angles $(\theta, \phi, \sigma)$, step 1 determines an error between each reference image $R_i$ and the range image I using a downhill simplex method for the translation values $(x, y, z)$, and step 2 selects the reference pose of the reference range image $R_i$ with a lowest global error.

15. The method of claim 1, further comprising:
refining the pose of the object in the range image.

16. The method of claim 15, in which the refining uses an iterative closest point procedure.

* * * * *